United States Patent [19]

Lüdke et al.

[11] 4,448,681
[45] May 15, 1984

[54] FLOATATION ARRANGEMENT

[75] Inventors: Hans Lüdke, Essen-Bredeney; Albert Bahr, Clausthal-Zellerfeld; Friedrich-Wilhelm Mehrhoff, Gladbeck; Karl Legner, Herten-Bertlich, all of Fed. Rep. of Germany

[73] Assignees: Bergwerksverband GmbH; Ruhrkohle AG, both of Essen, Fed. Rep. of Germany

[21] Appl. No.: 298,754

[22] Filed: Sep. 2, 1981

[30] Foreign Application Priority Data

Mar. 24, 1981 [DE] Fed. Rep. of Germany ....... 3111506

[51] Int. Cl.³ ............................ C02F 1/24; B03D 1/00
[52] U.S. Cl. .................................. 210/97; 210/221.2; 209/170; 261/87; 261/122
[58] Field of Search ................. 210/222.1, 222.2, 703, 210/706, 97, 104, 137; 209/170, 168; 261/122, 87

[56] References Cited

U.S. PATENT DOCUMENTS

| 3,179,252 | 1/1961 | Vrablik | 210/705 |
| 3,966,598 | 6/1976 | Ehelt | 210/221.2 |
| 4,162,972 | 7/1979 | Green | 210/221.2 |
| 4,186,094 | 1/1980 | Hellberg | 210/221.2 |

FOREIGN PATENT DOCUMENTS 2420482 11/1975 Fed. Rep. of Germany ... 210/221.2

Primary Examiner—Peter A. Hruskoci
Assistant Examiner—Sharon T. Cohen
Attorney, Agent, or Firm—Michael J. Striker

[57] ABSTRACT

An arrangement for floatation of solid particles from liquids such as from sewage, particularly for settling of coal from a conditioned pulp, has a conditioning device from which a pulp flows in a predetermined direction, gasifying device having a gasifying surface extending parallel to the pulp flow direction, and a separating device having a substantially upright conical container for foam formation, a level controlling element, and bubble generator composed of an elastic and porous synthetic plastic material.

7 Claims, 4 Drawing Figures

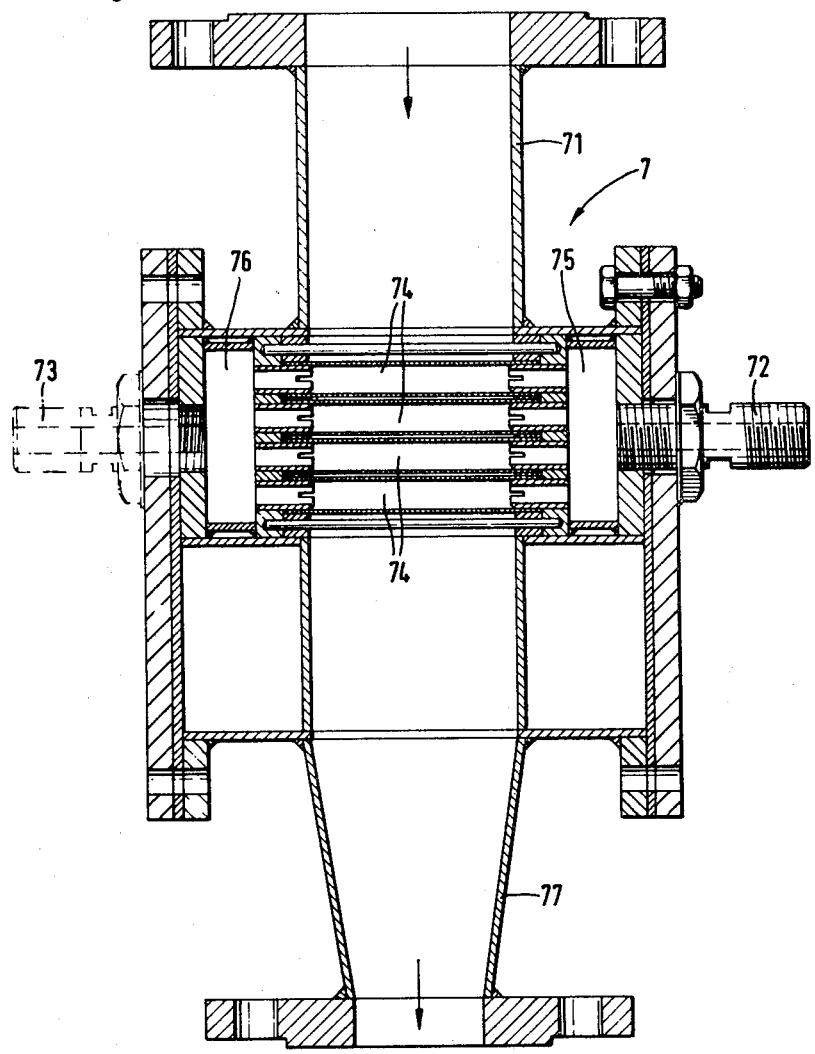

FLOATATION ARRANGEMENT

BACKGROUND OF THE INVENTION

The present invention relates to an arrangement for floatation of solid particles from liquids, for example, from sewages, particularly for separation of coal from conditioned pulp.

Arrangements of the abovementioned general type are known in the art. A known arrangement includes a conditioning device, a gasifying device with a gasifying surface extending parallel to the pulp flow direction, and a separating device having a conical container for foam formation and a level controlling element. In the conditioned pulp, the solid particles are repelled hydrophobically with the aid of organic or inorganic agents. The gasifying device generates gas bubbles on which the solid particles settle with certain assumptions that in the pulp gas bubble-solid particle complexes are generated, which are supplied into the separating device of a floatation arrangement for foaming up. Such an arrangement is disclosed, for example, in the German Pat. No. 2,402,482. The known floatation arrangement is provided within its gasifying device with a bubble generator which is composed of a ceramic material or metal. It has been recognized from experiments that the bubble generator during the operation and particularly during interruption of the operation by sedimentation, is subjected to operational disturbances because of clogging of the bubble generator. The latter does not therefore guarantee during the operation, a steady flow of gas bubble-solid particle complexes in the subsequently arranged separating device. Moreover, the known floatation arrangement has the disadvantage in the fact that its gasification device does not provide for a sufficient throughput of the subsequent separating device.

SUMMARY OF THE INVENTION

Accordingly, it is an object of the present invention to provide an arrangement for floatation of solid particles from liquids, for example, from sewages, which avoids the disadvantages of the prior art.

More particularly, it is an object of the present invention to provide an arrangement for floatation of solid particles from liquids, such as from sewages, which provides for a homogenous gasification whereby full adhering of all solid particles to be floatated in the gas bubbles in the pulp is guaranteed, and a high quantity output is possible without operational disturbances.

In keeping with these objects and with others which will become apparent hereinafter, one features of the present invention resides, briefly stated, in an arrangement in which gasifying devices are located ring-shaped above a conical container, connected with pulp supplying and gas supplying conduits, and provided with a bubble generator composed of an elastic and porous synthetic plastic material. The bubble generator may be composed, for example, of an elastic and porous low pressure polyethylene.

In accordance with another advantageous feature of the present invention, the arrangement for high air and pulp quantities has the bubble generator formed by a plurality of pipes which are arranged in several rows and extends transversely to the pulp flow direction. In this construction a plurality of streams are formed, they flow through the rows of the pipes, and the pipes have gasifying surfaces extending parallel to the pulp flow direction.

In accordance with still another advantageous feature of the present invention, the bubble generator in both end regions is connected with the gas supply conduit. This guarantees an improved and uniform gas supply into the plurality of pipes.

The arrangement in accordance with the invention provides for the highly advantageous results in the fact that the elastic construction of the bubble generator makes possible flow and turbulent vibration or movement of the bubble generator, particularly in radial and axial position. This releases the sedimentation on the outer surface which causes operation interruptions, and removes foreign substance penetrated into the pores so as to make possible fully homogenous gasification without operational disturbances. Moreover, the bubble generators which are arranged in a ring-shaped manner around the separating device provides for a higher flow rate of gas bubble-solid particle complexes which, in turn, makes possible a higher output of the separating device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a view showing a section of the gasifying device.

DESCRIPTION OF PREFERRED EMBODIMENTS

Figure 1:
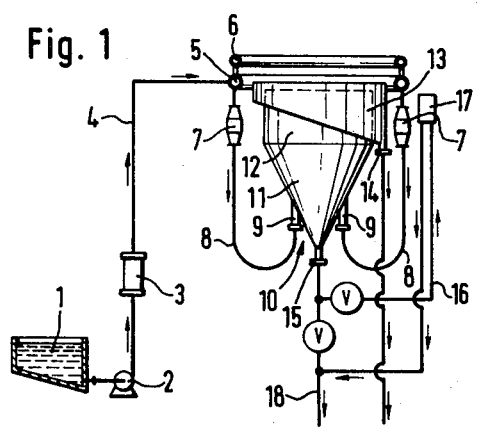
FIG. 1 is a view which schematically shows a floatation arrangement in accordance with the present invention.

An arrangement for floatation of solid particles from liquids shown in FIG. 1 in schematic form has a conditioning container 1 in which a pulp is conditioned with the aid of stirrers. In other words, chemicals are added to the pulp, which repel hydrophobically the solid particles. For the floatation of coal, a pine oil can be utilized for this purpose.

The conditioned pulp is supplied into a pulp ring-shaped conduit 5 by a pump 2, a compulsory mixer 3 which is not completely necessary, and a conduit 4. The pulp is supplied from the conduit 5 into gasifying devices 7 arranged ring-shaped around a separating device 10.

The gasifying device 7 is supplied via a ring-shaped gas conduit 6 and individual conduits which are not shown in detail, with gas, such as air. Gas bubbles of a suitable diameter are introduced into the flowing pulp in the gasifying device 7 as will be explained hereinbelow. The repelled solid particles attach to these gas bubbles. The pulp with the gas bubbles or gas bubble-solid particle complexes is supplied via a conduit 8 into a separating device 10.

The separating device 10 has a conical container 11 and a cylindrical portion 12 arranged on the container 11. Foam is formed in the separating device 10. The foam which is formed in the upper cylindrical portion 12 floats with or without stripping device into an overflow chamber 13 and to an outlet 14. The pulp depleted by the concentration of the solid particles flows with some solid particles which have not been repelled via an outlet 15 into discharge which leads to clarification. A container 17 for level control is arranged laterally of the separating device 10 and is adjustable in its height. The container 17 communicates via a conduit 16 with the separating device 10 for adjusting the pulp in the separating device 10. On the other hand, it communicates via a further conduit with the clarification device.

Figure 2:
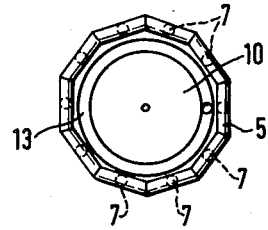
FIG. 2 is a plan view of a separating device with gasifying devices in a ring-shaped arrangement surrounding the separating device.

As can be seen from FIG. 2 showing the plan view of the separating device 10, the gasifying devices 7 have a ring-shaped arrangement and communicate with the ring-shaped pulp conduit 5. The number of the gasification elements 7 of the gasification device is variable and depends upon the dimension of the entire floatation arrangement.

Figure 3:
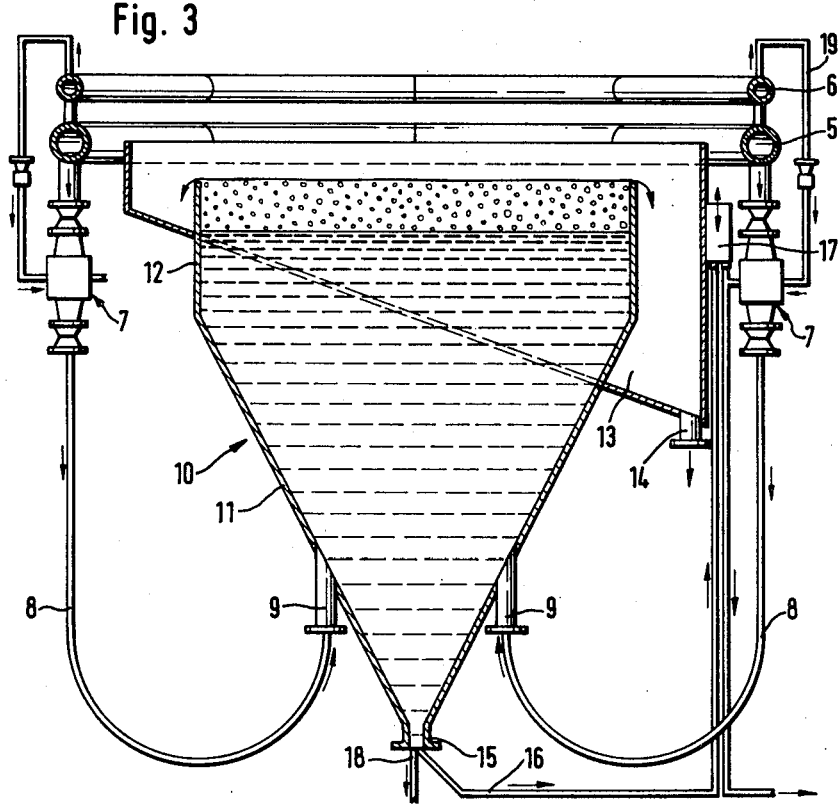
FIG. 3 is a view showing a section of the separating devices with the gasifying device arranged around the same.

FIG. 3 shows the arrangement of the gasification device or more particularly the gasification elements of the gasification device around the separating device 10. It can be seen that the pulp from the ring-shaped conduit 5 is supplied into the gasifying elements 7 via individual conduits from above, whereas the gas is supplied out of the ring-shaped gas conduit 6 via individual conduits 19 into the gasifying elements 7 laterally from one or both sides. The pulp which passes through the gasifying element 7 flows via conduits 8 over a great curve through inlets 9 provided in the lower region of the conical container 11. The inlets are arranged in the lowest region of the container 11, in order to guarantee quietness inside the stream in condition of buoyancy of the gas bubble-solid particle complexes.

FIG. 4 shows an example of the construction of the gasifying device 7. It is generally box-shaped and provided with bubble generators 74 which are pipe-shaped and composed of low pressure polyethylene or a similar synthetic plastic material which is elastic and porous. The bubble generator 74 extends transversely to the flow direction. The flow direction of the pulp is identified by the arrow in the region of connection pipes 71 and 77.

The gasifying device 7 has a connecting pipe 71 for connecting with a conduit extending from the ring-shaped pulp conduit 5. It also has the connecting pipe 77 for connection with the conduit 8 extending from the separating device 10. The gasifying device 7 is supplied via conduits 72 or 73 on a not-shown ring-shaped gas conduit, with gas or air or inert gas, for loading of the bubble generators 74.

In the construction shown in FIG. 4, four pipe or hose-like bubble generators 74 extend transversely to the flow direction. Gas distribution chambers 75 and 76 are provided between the gas pipes 72 and 73 for the gas supply, on the one hand, and the pipe-like bubble generators 74 on the other hand. The gas distributing chambers 75 and 76 surround the bubble generators 74. The gas distributing chambers 75 and 76 prevent formations of pressure impacts during the gas supply. The pipe-like bubble generators 74 of elastic and porous synthetic plastic material, such as low pressure polyethylene, are arranged in the embodiment shown in FIG. 4 in several rows one behind the other and one under the other. In all embodiments, the gasifying surface extends parallel to the pulp flow. The number of the bubble generators 74 located one under the other and in rows adjacent to each other corresponds to the quantity of the pulp and air passing through.

In accordance with another embodiments which is not shown in the drawings, the bubble generators 74 may be formed as a bundle of pipes extending parallel to the flow, whereas they also have a gasification face extending parallel to the flow. The bubble generator 74 does not necessarily have a pipe-like shape. It is also advantageous when the bubble generator 74 is formed, for example, by a plurality of plate-shaped chambers extending parallel to each other in flow direction.

In the embodiment shown in FIG. 4, the bubble generator 74 formed as a pipe has an inner diameter of at least 3 millimeter, and a pore dimension within the limits of between 2 and 5 micrometer. These values provide for a layer thickness of the liquid of pulp to be gasified between 2 and 10 millimeter, so that a completely homogenous gasification over the entire cross-section can be performed. The layer thickness of the liquid or pulp to be gasified between 2 and 10 millimeters, corresponds to the distance between the individual bubble generators 74 of at least 4 millimeter, and maximum of 20 millimeter. The pulp, during flowing through the gasifying device 7, causes vibrations of the flexible bubble generator 74. Thereby, clogging of not rigid and porous synthetic plastic pipe is avoided.

In accordance with a further embodiment which is also not shown in the drawings, the pulp can flow through the elastic pipe (the bubble generator 74) and simultaneously, the gas can be supplied from outside inwardly through the pipe so that the gas bubble are formed on the inner wall of the pipe.

It will be understood that each of the elements described above, or two or more together, may also find a useful application in other types of constructions differing from the types described above.

While the invention has been illustrated and described as embodied in an arrangement for floatation of solid particles from liquids, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for floatation of solid particles from liquids such as from sewage, particularly for separating of coal from a conditioned pulp, the arrangement comprising conditioning means from which a pulp flows in a predetermined direction; a pulp supplying conduit extending from said conditioning means; gasifying means having a gasifying surface extending parallel to the pulp flow direction and provided with a bubble generator; a gas supplying conduit; and separating means having substantially upright conical container for foam formation and a level controlling element, arranged laterally of said separator means for adjusting the level of the pulp in said separating means said gasifying means including a plurality of gasifying devices arranged in a ring-shaped manner around said conical container and each connected with said pulp supplying and gas supplying conduits so that when the pulp is supplied from said conditioning means via said pulp supplying conduit and said gas is supplied via said gas supplying conduit into each of said gasifying devices solid particles of the pulp adhere to gas bubbles produced in said gasifying devices and thus-formed gas bubbles-solid particles complexes are supplied into said separating means, said bubble generator of each of said gasifying devices is formed of at least one pipe composed of an elastic and porous synthetic plastic material, extending transversely to the flow direction of the pulp.

2. An arrangement as defined in claim 1, wherein said container has a conical lower portion and a cylindrical upper portion, said gasifying devices being arranged around said cylindrical portion of said gasifying means.

3. An arrangement as defined in claim 1, wherein said bubble generator of each of said gasifying devices is surrounded by a plurality of plate-shaped chambers extending parallel to one another in the pulp flow direction to prevent pressure formation during the gas supply.

4. An arrangement as defined in claim 1, wherein said gas supply conduit is ring-shaped, said bubble generator of each of said gasifying devices being connected at two ends with said ring-shaped gas supplying conduit.

5. An arrangement as defined in claim 1, wherein said bubble generator of each of said gasifying devices has an inner diameter of at least 3 mm and a pore width between 2 and 50 micrometer.

6. An arrangement as defined in claim 1, wherein each of said gasifying devices includes a plurality of such bubble generators spaced from one another by a distance which, with a pulp flow speed of not less that 0.5 m per sec, is equal to at least 4 mm, said bubble generators being spaced from one another by a maximum distance equal to 20 mm.

7. An arrangement as defined in claim 1, wherein said gas supplying conduit is ring-shaped, each of said gasifying devices including a plurality of such bubble generators, said gasifying means further having a plurality of gas distributing chambers arranged between said ring-shaped gas-supplying conduit and said bubble generators.

* * * * *